Patented Nov. 7, 1950

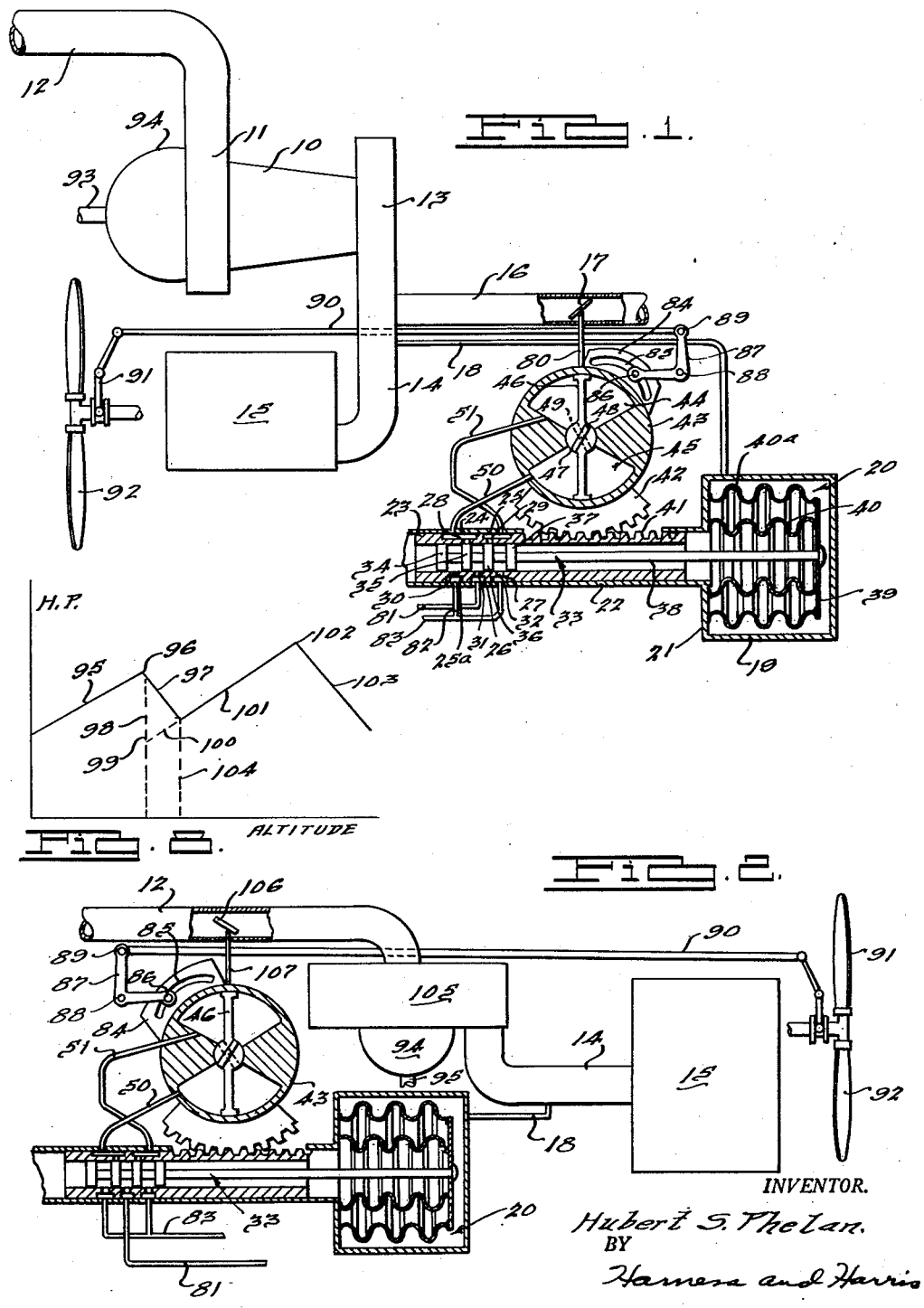

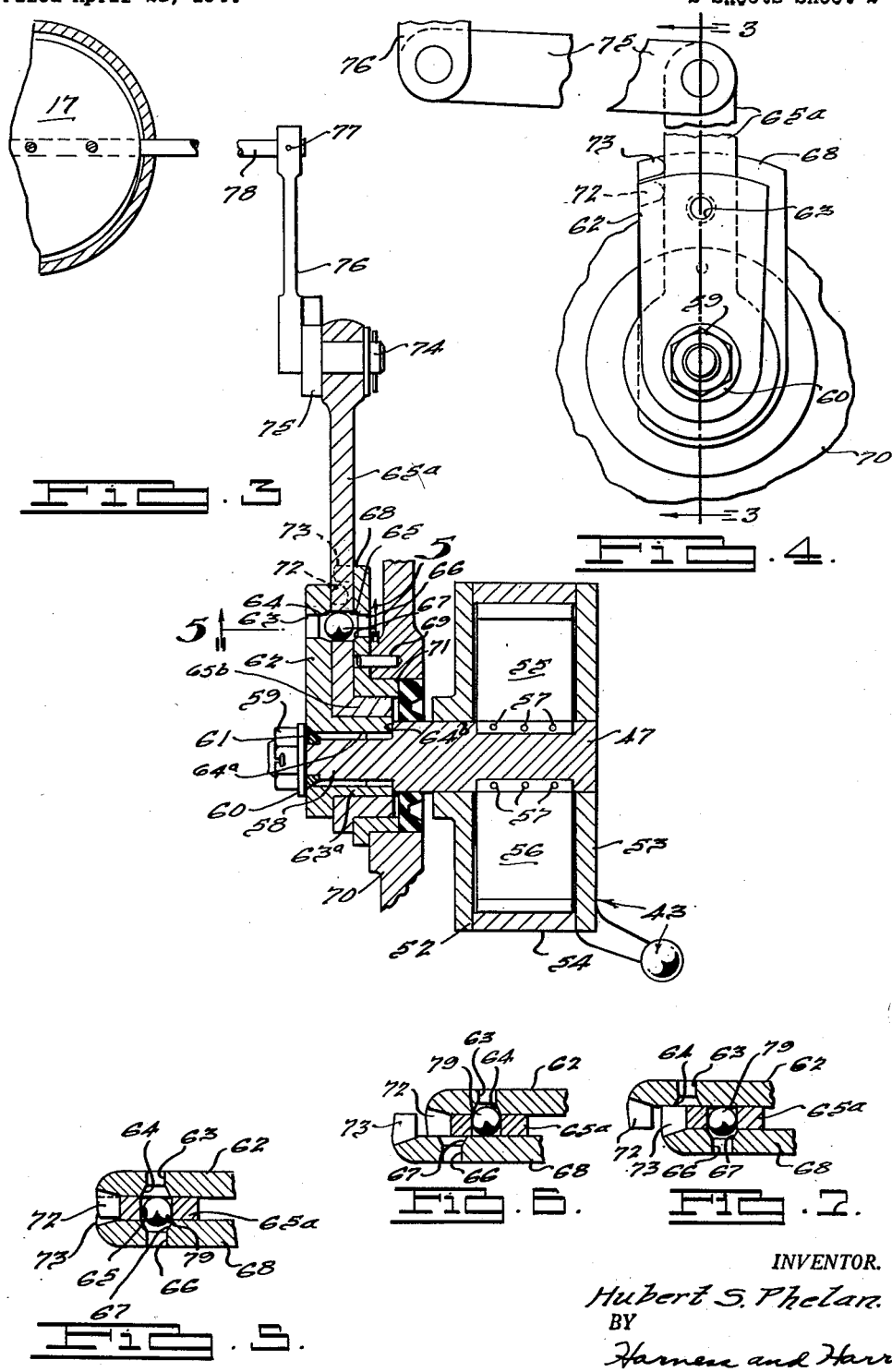

2,529,415

UNITED STATES PATENT OFFICE 2,529,415

CONTROL APPARATUS

Hubert S. Phelan, Berkley, Mich., assignor to Chrysler Corporation, Highland Park, Mich., a corporation of Delaware Application April 21, 1944, Serial No. 532,183

20 Claims. (Cl. 230—114)

This application relates to a connection between two parts connected for conjoint movement, providing overtravel of one part beyond a certain position of the other part. More specifically, this connection is applied to certain parts of control apparatuses for superchargers.

Let us consider the control apparatus for a supercharger. This may involve a spill gate in the delivery line of a supercharger movable toward and away from a closed position, thus regulating delivery pressure of the supercharger. The spill gate may be controlled by a regulator responsive to delivery pressure in such a way that the spill gate moves toward closed position if the actual delivery pressure falls below the predetermined delivery pressure, or moves toward open position if the actual delivery pressure rises above the predetermined delivery pressure. It may happen that the regulator responds to delivery pressure in such a way as to call for a position of the spill gate beyond the fully closed position. Ordinarily a stop limits the movement of the spill gate to closed position. Thus if the regulator calls for a position of the spill gate that it cannot reach, a serious strain may be imposed on the regulator, the spill gate, or the connecting parts. Consider now a control apparatus for a supercharger that operates by a throttle in an intake line of a supercharger to reduce the delivery pressure of the supercharger. A fully open position of the throttle brings about a maximum delivery pressure. It may happen that a regulator responsive to delivery pressure may call for a position beyond the fully open position of the throttle. Ordinarily a stop may be provided to prevent the throttle from moving beyond a fully open position, for such further movement would tend to close the throttle. Under this circumstance strain may be imposed on the regulator, the throttle, or the connecting parts.

I have invented a connection for use between a regulator and a spill gate or between a regulator and a throttle, that permits overtravel and thereby avoids the aforementioned strains. Although this connection is of great value in use with superchargers as outlined above, its use is not to be so limited, for the connection may find use wherever overtravel is necessary or desirable.

An object of the present invention is to provide an improved connection between parts permitting overtravel of one part with respect to the other part. Such connection allows the one part to move the other part up to a certain point beyond which it is not to go and the one part to go farther without moving the other part beyond the said certain point. This connection is used to great advantage between a regulator responsive to a certain condition and an operative element functioning to correct the condition, in a situation where the regulator tends to move the operative element beyond an extreme position. The regulator may taken the form of a manually adjustable casing and a vane therein shifted with respect to the casing by means of fluid under pressure.

A further object is to improve a connection between a spill gate for controlling delivery pressure of a supercharger and a regulator responsive to delivery pressure that acts through the connection to adjust the spill valve.

Another object is to improve a connection between a throttle in the intake line of a supercharger for controlling delivery pressure and a regulator responsive to delivery pressure that acts through the connection to adjust the throttle.

Other objects will appear from the disclosure.

In the drawings:

Fig. 1 is a diagrammatic view partially in section of one form of the present invention;

Fig. 2 is a diagrammatic view partially in section of a second form of the present invention;

Fig. 3 is a sectional view taken on the line 3—3 of Fig. 4 and showing details of the present invention;

Fig. 4 is an end view of a portion of the structure forming the present invention;

Fig. 5 is a sectional view of a detail of the present invention;

Figs. 6 and 7 are sectional views similar to Fig. 5 showing the parts of Fig. 5 in two different positions; and Fig. 8 shows a graph of the relation of horsepower developed by an engine to altitude.

As seen in Fig. 1, an axial supercharger 10 has an inlet end 11 to which is connected an inlet line 12 and an outlet end 13 to which is connected a delivery line 14 leading to an engine 15. A pipe 16 is connected to the delivery line 14 and in the pipe is mounted a spill gate 17 for use in reducing the pressure of gas delivered by the supercharger 10 in the line 14. A line 18 leads from the delivery line 14 to a casing 19 in which is mounted a bellows 20 secured at its left end to an end 21 of the casing 19. A sleeve 22 extends from the casing 19 and has mounted therein an outer or sleeve valve part 23 having at one side wide grooves 24 and 25 and at the other side three narrow grooves 25ª, 26, and 27. Ports 28 and 29 extend respectively from the grooves 24 and 25 to the interior of the sleeve valve part 23, and ports 30, 31, and 32 extend respectively from the grooves 25ª, 26, and 27 to the interior of the sleeve valve part 23. Slidably mounted within the outer or sleeve valve part 23 is an inner valve part 33 comprising essentially four spaced sections 34, 35, 36, and 37 and a rod 38. The rod 38 is secured at one end to a member 39 forming the right end of the bellows 20. The bellows also includes inner and outer corrugated walls 40 and 40ª, between which is a vacuum or reduced pressure. A rack 41 is formed on the exterior of the outer or sleeve valve part 23 and meshes with a gear segment 42 secured to a rotatable housing 43 having chambers 44 and 45. Mounted within the rotatable housing 43 is a vane 46 having a hub 47 in which are formed passages 48 and 49. A line 50 extends from the groove 24 to the portion of the chamber 45 to the left of the lower part of the vane 46, and a line 51 extends from the groove 25 to the portion of the chamber 44 to the left of the upper part of the vane 46.

As seen in Fig. 3, the rotatable housing 43 is formed of end members 52 and 53 and a spacer 54. As also seen in this figure, the vane 46 includes vane members 55 and 56 pinned to the hub 47 as indicated at 57. The hub 47 extends to the left of the rotatable housing 43 as viewed in Fig. 3 and terminates in a reduced portion 58 upon which is threaded a nut 59 holding a washer 60 having wedge portions 61 against a part 62 having a tubular portion 63ª held against a shoulder 64ᵇ on the hub 47. The tubular portion 63ª is splined on the reduced portion 58 as indicated at 64ª, and so that part 62 is secured to the hub 47 of the vane 46 against angular and axial movement with respect thereto. The part 62 has formed therein an opening 63 having a chamfered portion 64. As seen in Figures 3 and 5, the opening 63 is in registration with a through opening 65 formed in an arm 65ª having a tubular portion 65ᵇ mounted upon the tubular portion 63 of the part 62. The opening 65 is in registration with an opening 66 having a chamfered portion 67 formed in a part 68 fixed by a pin 69 to a fixed member 70 that may form part of a containing structure for the rotatable housing 43. The fixed part 68 has a sleeve portion 71 mounted on the sleeve portion 65ᵇ of the arm 65ª. The part 62 has a projecting lug 72 forming a stop engageable with one edge of the arm 65ª. The fixed part 68 has a projecting lug 73 above a lug 72 forming a stop engageable with the edge of the arm 65ª. The upper end of the arm 65ª is pivotally connected by a pin 74 to a link 75 projecting into the drawing as viewed in Fig. 3 and pivotally connected in turn to the lower end of an arm 76 secured by a pin 77 to a shaft 78 on which is fixedly mounted the spill gate 17.

As previously stated, Fig. 5 shows the openings 63 and 66 in registration with the opening 65. Assume the parts are in the position of Fig. 6. Movement of the part 62 to the left from the position of Fig. 6 causes a similar movement to the left of the arm 65ª, because a ball 79 of a diameter approximately equal to that of the opening 65 projects into the chamfered portion 64 of the opening 63. During this movement the ball 79 rests against the flat surface of the fixed part 68 rather than in the chamfer 67 and consequently must project upwardly into the chamfered portion 64 of the opening 63, since its diameter like the diameter of the opening 65 in the arm 65ª is greater than the thickness of the arm 65ª. When the part 62 and the arm 65ª reach the position of Fig. 5 in their movement to the left, the openings 65 and 63 are now in registry with the opening 66, and the ball 79 may move partially into the chamfer 67 of the opening 66. Further movement to the left of the arm 65ª is positively prevented by engagement of the arm with the lug 73 on the fixed part 68. Further leftward movement of part 62 causes chamfer 64 to urge ball 79 downwardly as viewed in Fig. 5, and since opening 65 now registers with opening 66 and chamfer 67, ball 79 can and does move downwardly out of chamfer 64 into chamfer 67, freeing part 62 from arm 65ª. Thus further leftward movement of part 62 may continue, and the parts assume the position of Fig. 7. Movement of the part 62 to the right to the position of Fig. 5 brings about no corresponding movement of the arm 65ª, but movement to the right of the part 62 beyond the position shown effects corresponding rightward movement of the arm 65ª. This is due to the fact that the lug 72 on the movable part 62 positively engages the arm 65ª forcing it to move to the right. The ball 79 shifts out of the chamfer 67 in the fixed part 68 to the chamfer 64 in the movable part 62. Since the movable part 62 and the vane 46 are secured to one another and movable as a unit through the hub 58, movement of the vane 46 brings about movement of the movable part 62. Clockwise movement of the vane 46, as viewed in Fig. 1, brings about movement to the left of the part 62 as viewed in Fig. 5, or movement into the drawing, as viewed in Fig. 3. Thus the arm 65ª has a similar movement to the left, as viewed in Fig. 5, or into the drawing, as viewed in Fig. 3, and acts through the link 75 to move the lower end of the arm 76 into the drawing, as viewed in Fig. 3. This brings about a counterclockwise rotation of the spill gate 17, as viewed in Fig. 1. To be brief, clockwise rotation of the vane 46, as viewed in Fig. 1, acts through the aforementioned parts, which may be designated by the reference character 80 in Fig. 1, to move the spill gate in a counterclockwise direction. The vane 46 may move clockwise beyond a position in which the part 62 is in the position of Fig. 2 and thus such further movement of the vane 46 is without effect upon the spill gate 17 in view of the fact that the openings 63, 65, and 66 and the ball 79 and the stops 72 and 73 permit the arm 65ª to remain in the position shown in Fig. 5.

In the position of Figure 1, the sections 35 and 36 of the valve part 33 cover the ports 28 and 29 preventing escape of fluid from chambers 44 and 45 in the rotatable housing 43 through the lines 50 and 51. The vane 46 is thus locked through the fluid with respect to the rotatable housing 43. The angular position of the housing 43 may be manually set to determine a desired pressure in the delivery line 14. Let it be assumed that a greater pressure in the delivery line is desired. The rotatable housing 43 is moved angularly in a clockwise direction to a position designating this new higher pressure in the delivery line. The fluid lock existing in the chambers 44 and 45 between the vane 46 and the rotatable housing 43 causes the vane also to be moved in a clockwise direction to a new angular position. This brings about a counterclockwise movement of the spill gate 17 or a reduction in the opening of the spill gate which in turn acts to raise the pressure in the line 14. This is merely an approximate position for the spill gate 17 for the particular pressure desired in the line 14. In the meantime, the clockwise rotation of the housing 43 will have acted through the gear segment 42 and the rack 41 to move the sleeve valve part 23 to the left. This causes the port 29 to be uncovered by the valve section 36 by movement to the left of the port 29 and thus fluid under pressure may flow from a pressure line 81 through the groove 26, the port 31, the space between the piston section 35 and 36, the port 29, the groove 25, and the line 51 to the portion of the chamber 44 to the left of the vane 46 and through the passage 49 to the portion of the chamber 45 to the right of the vane 46. This also brings about clockwise movement of the vane 46. Because of the leftward movement of the sleeve valve part 23, the port 28 is uncovered by the piston section 35 and fluid flows from the portion of the chamber 44 to the right of the vane 46, the passage 48, and the portion of the chamber 45 to the left of the vane 46 through the line 50, the groove 24, the port 28, the space between the valve section 34 and 35, the port 30, and the groove 25a to a branch 82 connected with a drain line 83. As the pressure in the line 14 increases to the new predetermined desired value, the bellows 20 collapses somewhat, moving the valve 33 to the left. This causes the valve sections 35 and 36 to cover the ports 28 and 29. Thus no more fluid under pressure is admitted to the line 51 and the fluid lock of the vane 46 in the rotatable member 43 is re-established.

For establishing a predetermined lower pressure in the intake line 14, the rotatable housing 43 is moved counterclockwise. This causes a corresponding counterclockwise movement of the vane 46 resulting in a clockwise movement of the spill gate 17 to a more open position, which reduces the pressure in the line 14. The outer valve part 23 moves to the right causing the port 28 to be uncovered. This connects the pressure line 81 with the line 50 and so fluid under pressure is supplied to the portion of the chamber 45 to the left of the vane 46 and through the passage 48 in the hub 47 to the portion of the chamber 44 to the right of the vane 46. This brings about a counterclockwise movement of the vane 46. The new lower pressure in the line 14 acts through the line 18 to expand the bellows 20 somewhat moving the inner valve 33 to the right to cause the piston sections 35 and 36 to cover the ports 28 and 29. This action re-establishes the fluid lock of the vane 46 within the rotatable housing 43.

Reference is made to the copending application of Paul W. Wyckoff, Serial No. 516,859, now U. S. Patent No. 2,463,931, and the copending application of Henry W. Gilfillan et al., Serial No. 480,786, now U. S. Patent No. 2,402,885, for a more complete showing and for claims to the rotatable housing 43 and vane 46 and to the cooperating valve parts 23 and 33.

Let it now be assumed that there arises in the line 14 a pressure lower than that for which the rotatable housing 43 is set. The bellows 20 expand somewhat moving the valve part 33 to the right causing the valve sections 35 and 36 to uncover the ports 28 and 29. The line 51 is placed in communication with the pressure line 81 and so fluid under pressure is admitted through the line 51 to cause the vane 46 to be moved clockwise. This causes a counterclockwise movement of the spill gate 17 toward a closed position. When the predetermined pressure in the line 14 is re-established the bellows 20 collapses somewhat moving the valve part 33 to the left and causing the valve sections 35 and 36 to cover the ports 28 and 29. This re-establishes the fluid lock of the vane 46 and the rotatable housing 43 and movement of the vane 46 and the spill gate 17 is halted. It may happen that when the pressure in the line 14 is reduced below the predetermined value that the spill gate 17 will reach a closed position before the bellows 20 collapses enough to make the valve sections 35 and 36 cover the ports 28 and 29 or without the foregoing happening at any time. Of course, it is most desirable that the spill gate 17 be so arranged in the outlet 16 that it cannot move beyond closed position for such action would open the spill gate 17. Thus there may be a condition in which the spill gate 17 can move no further in a counterclockwise direction and yet the vane is urged in a clockwise direction because the port 29 through which fluid is supplied from the pressure line 81 to the line 51 leading to the rotatable housing 43 remains uncovered. If there were no position for overtravel between the vane 46 and the spill gate 17, the vane 46 could not move farther in a clockwise direction after the spill gate 17 had moved counterclockwise to an extreme closed position. This would place a very undesirable strain upon the parts involved. However, the connecting parts between the vane 46 and the spill gate 17 previously described with reference to Figures 3, 4, and 5 permit an overtravel of the vane 46.

As has been previously described, the arm 65a can move to the left as shown in Fig. 5 only as far as the lug 73 on the fixed part 68. When the arm 65a is in this position engaging the lug 73, the spill gate 17 which is connected to the arm 65a through the link 75, the arm 76 and the shaft 78, is in fully closed position. The vane 46 acting through the part 62 to which it is attached for conjoint angular movement, will have, as from the position shown in Figure 6, acted through the ball 79 in the opening 65 in the arm 65a and the chamfer 64 in the part 62 to bring the arm 65a to the position shown in Figure 5. Further clockwise movement of the vane 46 causes further movement of the part 62 to the left, as seen in Figure 7, moving the lug 72 out of contact with the arm 65a. Clockwise movement of the vane 46 continues until the pressure in the line 14 actually reaches the predetermined value that will cause the bellows 20 to collapse sufficiently to make the valve sections 35 and 36 cover the ports 28 and 29 for re-establishment of the fluid lock of the vane 46 in the rotatable housing 43, or until the vane 46 contacts respectively the right side of the chamber 44 and the left side of the chamber 45. It is evident, of course, that if the fluid lock of the vane 46 within the rotatable housing 43 is re-established there is not strain on the vane 46. The same will be true if the vane 46 moves far enough to contact the ends of the chambers 44 and 45.

It may be advantageous for other reasons to let the rotor 43 travel beyond the closed position of the spill gate 17. The rotor 43 is shown to have a portion 84 provided with a cam slot 85 in which rides a follower 86 on one arm of a bell crank 87 pivoted at 88. The other arm of the bell crank is connected at 89 to a link 90, connected in turn to a control 91 for a propeller 92 adapted to be driven by the engine 15. The control 91 governs the pitch of the propeller 92. It will be apparent that as the pitch of the propeller is changed, the speed of the propeller and the engine will be changed.

Now it is known that there should be a definite relation between engine speed and manifold pressure. The cam slot 85 is so formed as to act through the bell crank 87, the link 90, and the control 91 to insure this relation. The position of the rotar 43 predetermines manifold pressure and likewise, through a positioning of the slot 85, the angular position of the bell crank 87 and thus the setting of the control 91 for a given pitch of the propeller 92, which in turn determines speed of the engine 15.

Let us now consider how these parts function in cooperation with the overtravel means of the present invention. Suppose that the spill gate 17 has had to go all the way to closed position in order to bring about the delivery pressure predetermined by the position of the rotor 43. If now a greater delivery pressure is desired, the rotor 43 is moved clockwise to a new setting. Because of the uncovering of the ports 28 and 29 and the connection of the line 51 to the pressure line 81 and the connection of the line 50 to the drain line 83, the vane 46 rotates clockwise toward the right and left ends of the chambers 44 and 45. This movement of the vane 46 is permitted because of the overtravel means of the present invention. In spite of the fact that there is no change in the position of the spill gate 17, there will be an increase in the delivery pressure in the line 14, for the cam slot 84 is so shaped that with clockwise movement of the rotor 43 the bell crank 87 moves so that the control 91 adjusts the pitch of the propeller 92 to increase the speed of the engine 15. Since the engine drives a driven shaft 93 by means, not shown, and shaft 93 drives through a transmission 94 the supercharger 10, the speed of the supercharger is increased. This has the effect of increasing the pressure in the delivery line 14, as desired.

The overtravel means may have other advantages. Consider Fig. 8 which shows in the form of a graph the relation of altitude of the engine and the horsepower developed by the engine, by use of the transmission 94 which is presumed to be of a type that has a low speed for a given speed of the shaft 93 at a low altitude and a high speed for a given speed of the shaft 93 at a high altitude. The desirability of these two speed ratios, of course, needs no explanation. In Fig. 8 a line 95 represents the relation of altitude to horsepower developed for low-speed ratio of the supercharger. The horsepower increases with altitude until a maximum point 96, at which further increase in altitude causes a reduction in horsepower as indicated by the line 97. Theoretically, shifting should occur at the altitude of the point 96 represented by dotted line 98. If it did, the horsepower would drop along the altitude line 98 to a point 99, which is the value of horsepower developed for the altitude represented by 99 for the high speed ratio of the transmission 94. Then the horsepower would increase with altitude along dotted line 100 and full line 101 to point 102 and then decrease along line 103. On the other hand, if the shifting from low speed ratio to high speed ratio can be delayed until the altitude represented by dotted line 104 is reached, then the horsepower between altitudes 98 and 104 follows the line 97 rather than the line 100, and so the horsepower in this interval is greater by the space between these lines. Obviously, the latter course is more desirable.

The overtravel means of the present invention makes it feasible. When the point 96 is reached, the spill gate 17 will be in closed position for a certain predetermined value of delivery pressure. As the altitude increases beyond the value represented by line 98 on which maximum point 96 is located, the delivery pressure decreases. Thus through uncovering of the ports 28 and 29 caused by the effect of the lower delivery pressure on bellows 20, the vane 46 is urged clockwise by the pressure fluid admitted to the housing 43. This will continue until the altitude represented by line 104 is reached, at which altitude shifting of the transmission to the high-speed ratio takes place. Unless there is provision for overtravel between the vane 46 and the spill gate 17, there will be strain imposed upon the parts. Moreover, since the vane 46 if tied rigidly to the spill gate 17 could not move, there would be a reaction on the rotary housing 43 tending to move it counterclockwise. This would result in a call for a lower predetermined pressure, as against the actual need for a higher pressure, and the operation of the whole apparatus would be upset. Thus there is a very marked advantage in the use of the overtravel means of the present invention.

As shown in Fig. 2, there is provided a radial supercharger 105 which receives air through an inlet line 12 and delivers it through a delivery line 14 to an engine 15. Pressure in the delivery line 14 is controlled by a throttle 106 positioned in the inlet line 12. The throttle 106 is connected by means represented diagrammatically in Fig. 2 by the reference character 107 to the vane 46 and the rotatable housing 43. This means is the same as that shown in Figures 3, 4, and 5. The only difference is that the throttle 106 will be in a fully open position for a maximum pressure in the delivery line 14. Movement to fully open position from the position shown in Fig. 2 involves a counterclockwise movement. This is produced by a clockwise movement of the vane 46. Bellows 20 is controlled from pressure in the delivery line 14 transmitted through the line 19 and in turn controls the position of the inner valve part 33 supplying the fluid under pressure to the line 50 or the line 51 from the pressure line 81 as is described with reference to Fig. 1.

A stop, not shown, is provided for limiting counterclockwise movement of the throttle 106 so that it cannot move beyond a fully open position. It may happen that when the throttle 106 reaches the fully open position the pressure in the line 14 may not be sufficiently high to cause the bellows 20 to collapse enough to make valve sections 35 and 36 cover ports 28 and 29, which action would establish a fluid lock of the vane 46 within the rotatable housing 43. Thus fluid under pressure continues to be supplied through the line 51 so as to urge the vane 46 in a clockwise direction. It may happen finally either that the pressure in the line 14 does rise sufficiently to cause the re-establishment of the fluid lock of the vane 46 in the rotatable housing 43 or that the vane 46 reaches respectively the right end of the chamber 44 and the left end of the chamber 45 in the housing 43. The parts described with reference to Figures 3, 4, and 5 permit the necessary overtravel of the vane 46 with respect to the throttle 85.

As in the case of Fig. 1, the rotor 43 of Fig. 2 carries a portion 84 having a cam slot 85, in which is positioned a cam follower 86 carried on one arm of a bell crank 87 pivoted at 88. The other arm of the bell crank is pivotally connected at 89 to one end of a link 90, the other end of which is connected to a control 91 for adjusting the pitch of a propeller 92 driven by the engine 15. When a fully open position of the throttle 106 is reached in producing a certain predetermined pressure in the delivery line 14, the operator may move the rotor 43 clockwise to a new setting for a greater predetermined pressure, and the resultant shifting of the cam slot 85 acts through the bell crank 87, the link 90, and the control 91 changes the pitch of the propeller 92 and thereby increases the speed of the propeller and the engine 15. This increase in engine speed is communicated through an engine driven shaft 93 and a transmission 94 to the supercharger 105. Increase in speed of the supercharger 105 brings about an increase in the pressure in the delivery line 14. Since the clockwise movement of the rotor 43 producing this increase in delivery pressure, produces a corresponding clockwise movement of the vane 46, there is need for the overtravel means of the present invention between the vane 46 and the throttle 106.

If, as is most desirable, the transmission 94 for the supercharger 105 has two speed ratios, then there will be a relation of horsepower and altitude established similar to that shown in the graph of Fig. 8. Since it will be desirable to have the horsepower follow the line 97 rather than the line 100 between the altitudes represented by lines 98 and 104, it will be necessary to shift at altitude 104 rather than at altitude 98. In order that this may be possible, the vane 46 must be able to travel beyond the fully open position of the throttle 106, and so there is need for the overtravel means of the present invention.

It will be obvious to those persons skilled in this art that other variations and modifications of the aforedescribed arrangement may take place all within the scope of the present invention.

I claim:

1. In combination, a stationary member having a stop and a ball-receiving depression, a first movable member adapted to move in one direction up to engagement with the stop and in the opposite direction away from engagement with the stop and having a through opening directly opposite the depression in the stationary member in the position of engagement of the first movable member with the stop of the first member, a second movable member having a projection adapted by engagement with the first movable member to cause movement of the second movable member in the said opposite direction to move the first movable member in the said opposite direction away from engagement with the stop of the stationary member, the second movable member having a ball-receiving depression directly opposite the through opening in the first movable member upon engagement of the projection of the second movable member with the first movable member, and a ball positioned in the through recess of the first movable member and having a diameter greater than the thickness of the first movable member, and projectible into the recess in the second movable member in a position of displacement of the first movable member in the said opposite direction from engagement with the projection of the stationary member for causing movement of the second movable member in the said one direction to move the first movable member in the said one direction up to engagement with the stop of the stationary member and projectible from the recess of the second movable member into the recess in the stationary member upon engagement of the first movable member with the stop of the stationary member for causing further movement of the second movable member in the said one direction to be without effect upon the first movable member.

2. In combination, a first member, a second member, a third member, means for causing the first member to limit movement of the second member in one direction to a certain position and to permit movement of the second member in the opposite direction away from the said certain position, means for causing movement of the third member in the said opposite direction to move the second member in the said opposite direction away from the said certain position, control means positioned in the second member and adapted to be projected toward the first member or toward the third member, means on the third member for receiving the control means to cause movement of the third member in the said one direction to effect movement of the second member in the said one direction up to the said certain position, and means on the first member for receiving the control means to cause further movement of the third member in the said one direction to be without effect upon the second member.

3. Apparatus for use in adjusting a spill gate for the delivery line of a supercharger or the like for controlling pressure, said apparatus comprising a rotor angularly movable manually to various positions representing predetermined values of pressure an element mounted for angular movement with respect to the rotor and for conjoint angular movement with the rotor, fluid means for adjusting the element with respect to the rotor, valve means controllable by pressure for establishing a fluid lock of the element with respect to the rotor, and means for connecting the element to the spill gate for conjoint movement with provision for overtravel of the element beyond an extreme position of the spill gate, said connecting means comprising a fixed part having a recess and a stop, a first part adapted to be connected to the spill gate and having a through opening registering with the recess upon engagement of the first part with the stop on the fixed part, a ball in the through opening of greater diameter than the thickness of the first movable part, and a second movable part connected with the element and having a recess and a projection engageable with the first part upon registration of the recess with the through opening in the first movable part.

4. Apparatus for adjusting a regulator of pressure of a supercharger, said apparatus comprising a first member movable manually to various positions representing predetermined values of pressure, a second member mounted for movement with respect to the first member and for conjoint movement with the first member, fluid means for adjusting the second member with respect to the first member, valve means controllable by pressure for establishing a fluid lock of the members, and means connecting the second member and the regulator for conjoint movement with provision for overtravel of the second member beyond an extreme position of the regulator, said connecting means comprising a fixed part, a first movable part connected with the regulator, a second movable part connected with the second member, and means projectible from one side or the other of the first movable part so as to cause by engagement with the second movable part conjoint movement of the movable parts up to a certain position corresponding to the extreme position of the regulator and to cause by engagement with the fixed part the first movable part to be held in spite of further movement of the second movable part.

5. Apparatus for adjusting a regulator of the delivery pressure of a supercharger, said apparatus comprising means responsive to delivery pressure for adjusting the regulator, and means connecting the regulator and the pressure-responsive means for causing movement of the pressure-responsive means to bring the regulator up to an extreme position with provision for overtravel of the pressure-responsive means, said connecting means comprising a fixed part having a recess and a stop, a first movable part connected with the regulator and having a through opening registering with the recess upon engagement of the first movable part with the stop on the fixed part, a ball in the through opening of greater diameter than the thickness of the first movable part, and a second movable part connected to the pressure-responsive means and having a recess and a projection engageable with the first part upon registration of the recess with the through opening in the first movable part.

6. The apparatus specified in claim 3, the recesses in the movable parts being chamfered.

7. Apparatus for adjusting a regulator of the delivery pressure of a supercharger, said apparatus comprising means responsive to pressure for adjusting the regulator, and means connecting the regulator and the pressure-responsive means for causing movement of the pressure-responsive means to bring the regulator up to an extreme position with provision for overtravel of the pressure-responsive means, said connecting means comprising a fixed part, a first movable part connected with the regulator, a second movable part connected with the pressure-responsive means, and means projectible from one side or the other of the first movable part so as to cause by engagement with the second movable part, conjoint movement of the movable parts up to a certain position corresponding to the extreme position of the regulator and to cause by engagement with the fixed part the first movable part to be unyieldably held in spite of further movement of the second movable part.

8. An apparatus for adjusting the regulator of delivery pressure of a supercharger, said apparatus comprising manually settable means adjustable to different positions representing predetermined values of pressure, and means connecting the regulator and the manually settable means to bring the regulating means to an extreme position with provision for overtravel of the pressure-responsive means, said connecting means comprising a fixed part, a first movable part connected with the regulator, a second movable part connected with the manually settable means, and means projectible from one side or the other of the first member so as to cause by engagement with the second member conjoint movement of the movable parts up to a certain position corresponding to the extreme position of the regulating means and to cause by engagement with the fixed part the first movable part to be unyieldably held in spite of further movement of the second movable part.

9. In combination, a fixed part having a recess and a stop, a first movable part having a through opening registering with the recess upon engagement of the first movable part with the stop on the fixed part, a ball in the through opening of greater diameter than the thickness of the first movable part, and a second movable part having a recess and a projection engageable with the first part upon registration of the recess with the through opening in the first movable part.

10. The combination specified in claim 9, the recesses in the fixed part and the second movable part being chamfered.

11. In combination, a fixed part including means forming an offset face, a first movable part, a second movable part, and means projectible from one side or the other of the first movable part so as to cause by engagement with the second movable part conjoint movement of the movable parts up to a certain position and to cause by engagement with the offset face of the fixed part the first movable part to be held in spite of further movement of the second movable part.

12. In combination, a first movable part, a second movable part movable conjointly with the first movable part up to a certain point, a fixed part blocking movement of the second movable part beyond the said certain point, and shifting means associated for movement at all times with said second movable part for cooperating jointly with the first and second movable parts up to arrival of the second movable part at said certain point for causing the second movable part to be brought there by the first movable part and ceasing to cooperate jointly with the movable parts upon arrival of the second movable part at the said certain point for permitting further movement of the first movable part without further movement of the second movable part beyond the said certain point.

13. In combination, a rotor shiftable angularly to various positions, a vane rotatably mounted in the rotor, fluid means for controlling the adjustment of the vane with respect to the rotor, valve parts relatively positionable for causing the fluid means to adjust the vane with respect to the rotor in one direction or in the opposite direction and to provide a fluid lock of the vane with respect to the rotor, means for shifting the rotor to one of its aforesaid various positions to cause the fluid lock to shift the vane to an approximate new position, means connecting one valve part to the rotor for causing the aforesaid shifting of the rotor to produce a relative position of the valve parts breaking the fluid lock for adjusting the vane to an accurate new position, and means including a set comprising a freely shiftable and solid detent member and a stationary cooperating structure presenting an obstructed path of travel to be encountered in movement occasioned in assumption by the vane of said accurate new position, said last named means being connected with the vane for taking positions conforming therewith and indicative thereof, and making provision, as attended by shift of said free solid detent member, for overtravel of the vane beyond the bounds of what limits of obstruction the stationary member would tend to define.

14. In combination, a rotor shiftable angularly to various positions, a vane rotatably mounted in the rotor, fluid means for controlling the adjustment of the vane with respect to the rotor, valve parts relatively positionable for causing the fluid means to adjust the vane with respect to the rotor in one direction or in the opposite direction and to provide a fluid lock of the vane with respect to the rotor, means for shifting the rotor to one of its aforesaid various positions to cause the fluid lock to shift the vane to an approximate new position, means connecting one valve part to the rotor for causing the aforesaid shifting of the rotor to produce a relative position of the valve parts breaking the fluid lock for adjusting the vane to an accurate new position, and means connected with the vane for taking positions corresponding to and indicative of the assumption by the vane of said accurate position and offering an obstructed path of motion at a predetermined one of said corresponding positions and then therepast providing for appropriate overtravel of the vane in order to prevent tendency of the rotor to move in a direction opposite to the direction of movement attempted by the vane, the means providing for overtravel of the vane comprising a first part, a second part, a third part connected with the vane, means for causing the first part to limit movement of the second part in one direction to the extreme of said predetermined position and to permit movement of the second part in the opposite direction away from the said extreme position, control means positioned in the second part and adapted to be projected toward the first part or toward the third part, means on the third part for receiving the control means to cause movement of the third part in the said one direction to effect movement of the second part in the said one direction up to the said extreme position, and means on the first part for receiving the control means to cause further movement of the third part in the said one direction to be without effect upon the second part.

15. In combination, a rotor shiftable angularly to various positions, a vane rotatably mounted in the rotor, fluid means for controlling the adjustment of the vane with respect to the rotor, valve parts relatively positionable for causing the fluid means to adjust the vane with respect to the rotor in one direction or in the opposite direction and to provide a fluid lock of the vane with respect to the rotor, means for shifting the rotor to one of its aforesaid various positions to cause the fluid lock to shift the vane to an approximate new position, means connecting one valve part to the rotor for causing the aforesaid shifting of the rotor to produce a relative position of the valve parts breaking the fluid lock for adjusting the vane to an accurate new position, and means connected with the vane for taking positions corresponding to and indicative of the assumption by the vane of said accurate position and offering an obstructed path of motion at a predetermined one of said corresponding positions and then therepast providing for appropriate overtravel of the vane in order to prevent tendency of the rotor to move in a direction opposite to the direction of movement attempted by the vane, the means providing for overtravel of the vane comprising a fixed part, a first movable part, a second movable part connected with the vane, and means projectible from one side or the other of the movable part so as to cause by engagement with the second movable part conjoint movement of the movable parts up to said predetermined position and to cause by engagement with the fixed part the first movable part to be held in spite of further movement of the second movable part.

16. In combination, a first member manually shiftable to various positions, a second member mounted for movement with respect to the first member and for conjoint movement with the first member, fluid means for causing shifting of the first member to a certain position to produce first an approximate new position and then an exact new position of the second member, and a limit establishing device including a bodily-shiftable free detent and connected with the second member for taking disposition corresponding to and indicative of assumption by the second member of the aforesaid exact position and making provision upon appropriate shift of the free detent for circumvention of the limit as established and provision for the resulting overtravel of the second member in order to avoid any tendency of the first member to move in a direction opposite to the direction of movement attempted by the second member.

17. In combination, a first member manually shiftable to various positions, a second member mounted for movement with respect to the first member and for conjoint movement with the first member, fluid means for causing shifting of the first member to a certain position to produce first an approximate new position and then an exact new position of the second member, and means connected with the second member for assuming such corresponding disposition as indicates the assumption by the second member of the aforesaid exact position up to and including a limit defining disposition wherein the path of movement of said means is self-obstructed, and adapted then to make provision for appropriate overtravel of the second member as circumvents the self-obstructing feature in order to prevent tendency of the first member to move in a direction opposite to the direction of movement attempted by the second member comprising a first part, a second part, a third part connected with the second member, means for causing the first part to limit movement of the second part in one direction to an extreme position and to permit movement of the second part in the opposite direction away from the said extreme position, control means positioned in the second part and adapted to be projected toward the first part or toward the third part, means on the third part for receiving the control means to cause movement of the third part in the said one direction to effect movement of the second part in the said one direction up to the said extreme position, and means on the first part for receiving the control means to cause further movement of the third part in the said one direction to be without effect upon the second part.

18. In combination, a first member manually shiftable to various positions, a second member mounted for movement with respect to the first member and for conjoint movement with the first member, fluid means for causing shifting of the first member to a certain position to produce first an approximate new position and then an exact new position of the second member, and means connected with the second member for assuming such corresponding disposition as indicates the assumption by the second member of the aforesaid exact position up to and including a limit defining disposition wherein the path of movement of said means is self-obstructed, and adapted then to make provision for appropriate overtravel of the second member as circumvents the self-obstructing feature in order to prevent tendency of the first member to move in a direction opposite to the direction of movement attempted by the second member, said last named means comprising a fixed part, a first movable part, a second movable part connected with the second member, and means projectible from one side or the other of the movable part so as to cause by engagement with the second movable part conjoint movement of the movable parts up to an extreme position and to cause by engagement with the fixed part the first movable part to be held in spite of further movement of the second movable part.

19. In combination, a first member movable manually to various positions representing predetermined values of a condition, a second member mounted for movement with respect to the first member and for conjoint movement with the first member, means for adjusting the second member with respect to the first member, control means responsive to the said condition for establishing a lock of the members with respect to one another, and means connected with the second member for conjoint movement with provision for overtravel of the second member beyond a certain position corresponding to an extreme value of the condition, the last said means comprising a first movable part connected with the second member, a second part movable with the first movable part to a limiting disposition corresponding to the said certain position assumable by the second member, and means including a ball clutch-set for cooperating jointly with the movable parts only up to arrival of the second movable part at the said limiting disposition for causing the second movable part to be moved to the said limiting disposition by the first movable part.

20. An apparatus for adjusting the regulator of the delivery pressure of a supercharger, said apparatus comprising manually settable means adjustable to different positions representing predetermined values of delivery pressure of the supercharger, pressure-responsive means shiftably associated with the manually settable means whereby either means may act to take up reaction occasioned by shift relative to the other means, means responsive to inequality of the actual delivery pressure and the predetermined delivery pressure for shifting the pressure-responsive means with respect to the manually settable means, and interconnecting means for mutually interconnecting the regulator and the pressure-responsive means with provision for overtravel of the pressure-responsive means beyond an extreme position of the regulator calling for a maximum value, for causing failure of the actual maximum delivery pressure to become as high as the predetermined value to shift the pressure-responsive means with respect to the manually settable means without reaction on the parts, said interconnecting means comprising a first movable member connected for movement with the pressure-responsive means, a second movable member adapted for connection with the regulator and being movable conjointly with the first movable member up to a certain point representing the said extreme position of the regulator, a fixed part blocking movement of the second movable member beyond the said certain point, and shiftable means cooperating jointly with the first and second movable members up to arrival of the second movable member at said certain point for causing the second movable member to be moved to the said certain point by the first movable member and shiftable to cease cooperating jointly with the movable members upon arrival of the second movable member at the said certain point for permitting further movement of the first movable member without further movement of the second movable member beyond the said certain point.

HUBERT S. PHELAN.

REFERENCES CITED

The following references are of record in the file of this patent:

UNITED STATES PATENTS

| Number | Name | Date |
| --- | --- | --- |
| 865,556 | Andersen | Sept. 10, 1907 |
| 1,004,754 | Doyle | Oct. 3, 1911 |
| 1,015,254 | Whisler | Jan. 16, 1912 |
| 1,346,124 | Guerrlich | July 13, 1920 |
| 1,708,440 | Carhart | Apr. 9, 1929 |
| 1,713,833 | Kochendorfer | May 21, 1929 |
| 1,740,818 | Killingsworth | Dec. 24, 1929 |
| 1,803,660 | Swartwout | May 5, 1931 |
| 2,019,456 | Liebenberg | Oct. 29, 1935 |
| 2,187,120 | Gosslau et al. | Jan. 16, 1940 |
| 2,217,364 | Halford et al. | Oct. 8, 1940 |
| 2,228,239 | Ammann | Jan. 14, 1941 |
| 2,234,008 | Price | Mar. 4, 1941 |
| 2,281,987 | Oswald | May 5, 1942 |
| 2,303,998 | Holley | Dec. 1, 1942 |
| 2,322,109 | Bimberg | June 15, 1943 |
| 2,336,844 | Buck | Dec. 14, 1943 |
| 2,346,916 | Halford et al. | Apr. 18, 1944 |
| 2,356,124 | Stieglitz | Aug. 22, 1944 |
| 2,372,989 | Udale | Apr. 3, 1945 |
| 2,402,885 | Gilfillan et al. | June 25, 1946 |
| 2,453,651 | Mock | Nov. 9, 1948 |
| 2,463,931 | Wyckoff | Mar. 8, 1949 |

FOREIGN PATENTS

| Number | Country | Date |
| --- | --- | --- |
| 466,203 | Great Britain | May 18, 1937 |
| 470,492 | Great Britain | Aug. 12, 1937 |
| 687,901 | Germany | Feb. 8, 1940 |
| 852,019 | France | Oct. 16, 1939 |

Certificate of Correction

Patent No. 2,529,415 — November 7, 1950

HUBERT S. PHELAN

It is hereby certified that error appears in the printed specification of the above numbered patent requiring correction as follows:

Column 2, line 8, for "taken" read *take*; column 3, line 35, for "that part" read *the part*; column 6, line 54, for "not" read *no*; column 14, line 28, after "member" insert the comma and words , *said last named means*;
and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*